UNITED STATES PATENT OFFICE.

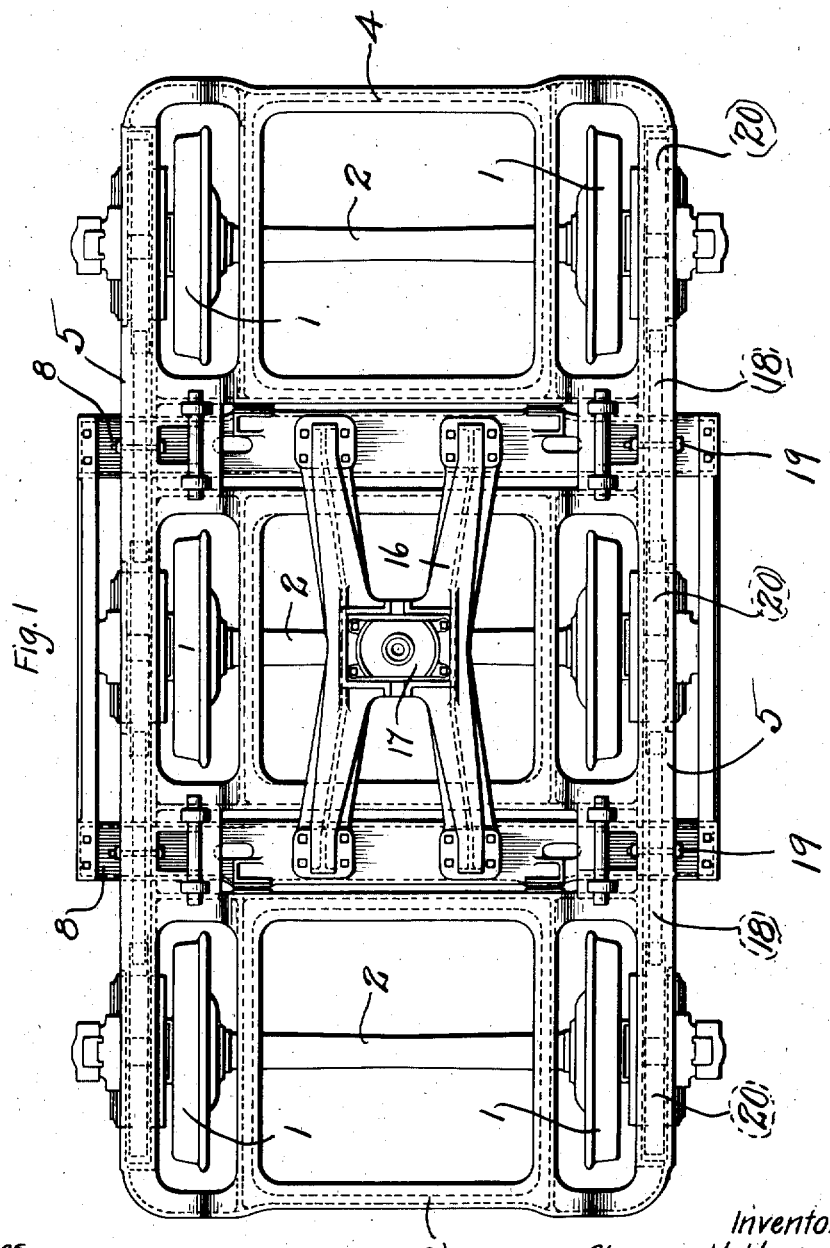

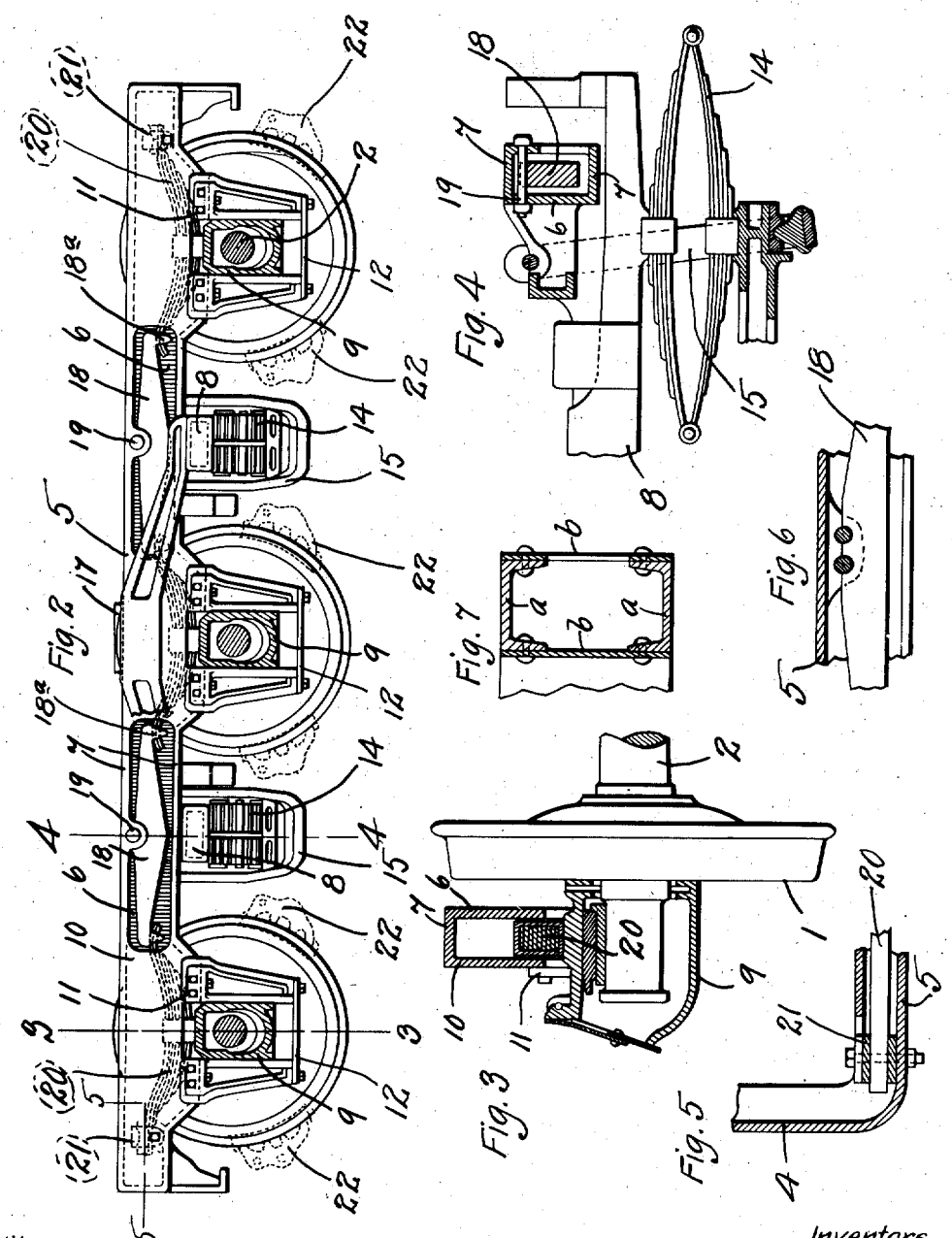

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

TRUCK CONSTRUCTION.

1,080,555.  Specification of Letters Patent.  Patented Dec. 9, 1913.

Application filed November 18, 1912. Serial No. 732,099.

*To all whom it may concern:*

Be it known that we, CLARENCE H. HOWARD and HARRY M. PFLAGER, citizens of the United States, residing at St. Louis, Missouri, have invented a certain new and useful Improvement in Truck Construction, of which the following is a full, clear, and exact description, such as will enable others skilled in the art to which it appertains to make and use the same, reference being had to the accompanying drawings, forming part of this specification, in which—

Figure 1 is a top view illustrating one form of our improved truck construction. Fig. 2 is a side view partly in section and showing contained parts in dotted lines. Fig. 3 is a detail in section on line 3—3 of Fig. 2. Fig. 4 is a detail in section on line 4—4 of Fig. 2. Fig. 5 is an enlarged horizontal section taken approximately on line 5—5 of Fig. 2. Fig. 6 is a detail section showing a modified arrangement of mounting the rigid equalizing members on the truck frame. Fig. 7 is a cross sectional view of a built up wheel piece adapted to receive the rigid and flexible equalizing members.

Our invention relates generally to railway truck construction and more particularly to the construction of truck frame wheel pieces and the arrangement of the equalizing members with respect to the truck frame. In car construction, and particularly those cars utilized for the transportation of passengers, the distance from the top of the rails to the top of the truck frame, and likewise the distance from the top of the truck frame to the under side of the car body, is limited; and in the forms of trucks now generally in use the equalizing bars are in the form of depending U-shaped members having their ends mounted on journal boxes and having portions extending below the truck bolsters and between the wheels to carry the springs upon which the truck frame rests. Thus the equalizing bars are necessarily of considerable length so as to reach from journal to journal and they must be of considerable size in order to possess the requisite strength. Because of their size and the position in which they are placed, the brake heads, the brake beams, and other parts carried thereby, which are disposed inside the truck, are to a considerable extent covered up and are therefore inaccessible for inspection or repairs.

It is the purpose of our invention to construct a truck so arranged that the inside brake shoes and heads will be readily accessible for repairs or inspection and with this in view, we have constructed the wheel piece of the truck frame substantially hollow or of such shape so as to receive the equalizing members, thus getting the equalizing mechanism in without materially raising the top of the frame and utilizing the space between top of frame and cross bolsters, which has heretofore not been utilized.

By virtue of our improved construction, we are enabled to materially shorten the rigid equalizing members and make them both lighter and stronger. Moreover, we are enabled to dispose the equalizing members so that they are entirely contained within the truck frame where, if broken, they are not likely to fall on to the track and cause derailment of the car.

Furthermore, in our improved construction, we are enabled to utilize half-elliptic springs in place of the half-coiled springs now usually employed and thereby secure a more flexible and easy acting suspension of the truck frame characteristic of elliptic springs as contrasted to coiled springs.

As illustrated in the drawings, our invention is shown as applied to a six-wheel truck, but it is obvious that our invention is not limited to use on six-wheel trucks, but may be employed on trucks having other wheel arrangements.

Referring by numerals to the accompanying drawings, 1 designates the wheels carried upon the usual axles 2. The truck frame 4, as shown, is formed in a single piece, preferably by casting, and comprises side members or wheel pieces 5, and the usual end rails, cross transoms, and wheel guards. The wheel pieces 5 are substantially channel shape throughout their length with the exception of portions that are disposed from the journal boxes and these portions are substantially box shape in cross section.

6 designates the inner or back wall of the wheel piece, and formed integral therewith, and projecting outwardly therefrom are top and bottom flanges 7, thus maintaining the channel shape of the wheel pieces immediately over the bolsters 8 and between the portions of the wheel pieces over the journal boxes. At the portions which are disposed over the journal boxes, the wheel pieces are provided with integral front walls or webs 10, shown in Fig. 3, and these walls or webs materially reinforce the wheel pieces immediately over the journal boxes and at the points of attachment of the pedestal jaws. The bottom flange of the wheel piece is cut away at the center of each box-shaped portion in order to accommodate the vertical movement of the journal box and the equalizer spring resting thereupon. The pedestal jaws 11 are secured in any suitable manner to the walls or webs 10 and to the bottom flange of the wheel piece to the sides of the journal box opening in said bottom flange and the lower extremities of said jaws are united by a suitable tie strap. The truck bolsters 8 of suitable construction are carried in the usual manner upon elliptical springs 14, which latter are carried upon the usual spring plank supported from the truck frame by hangers 15. The center beam or bolster 16 is carried by the truck bolsters and in turn supports the center bearing 17. Within the outwardly opening portion of each wheel piece 5, or those portions between the portions which are box shape in cross section, are arranged rigid equalizing bars 18 which are preferably fulcrumed at 19. As shown in Fig. 2, each equalizing bar is provided with a single fulcrum, although, if desired, a double fulcrum, as shown in Fig. 6, may be utilized. The ends of the equalizing bars 18 rest upon or are connected to the end portions of half elliptic springs 20 which are also disposed within the wheel pieces and the ends of said equalizing bars are provided with rounded bearing faces and depending lugs 18ª which engage the end portions of said springs. The springs 20 are mounted directly upon the journal boxes 9 or upon bearing blocks carried by said journal boxes, said springs supporting the weight of the truck frame and parts carried thereby. The ends of springs 20 at the extremities of wheel pieces are engaged by links 21, the same being arranged within and pivoted to the wheel pieces.

By our improved construction, the wheel pieces and arrangement of the equalizing members therein, the brake heads 22 seen in dotted lines in Fig. 2, and other parts within the truck are in plain sight from the side of the truck so that they may be readily inspected and the brake shoes or other parts within the truck may be readily applied or removed. It will also be seen that the equalizing members comprising the bars 18 and springs 20 are contained completely within the hollow wheel pieces of the truck frame and thus if any of said members should become broken, they will in all probability be retained in the hollow wheel pieces and thus be prevented from dropping on to the track.

By our improved construction, it is a comparatively easy matter to assemble the equalizing members and to replace or repair the same if necessary. At the extremities of the wheel pieces, the channel shape is maintained but the position of the vertical web or wall is reversed with respect to the channel shaped portions of the wheel pieces between the journal boxes; that is, said vertical wall or web is positioned on the outside with the horizontally disposed flanges projecting inwardly. This arrangement is clearly shown in Fig. 5. Our improved arrangement of parts secures a flexible and universal equalization between the different pairs of wheels by virtue of the pivotal engagement of the truck frame with the equalizing bars, for if any one of the wheels is raised or lowered relative to the others, the equalizing bars 18 will be rocked on their fulcrums so as to maintain an equal distribution of the weight upon all of the wheels. By thus increasing the flexibility of the truck, the riding movement of the car is made more easy and gentle and by arranging the equalizing members within the hollow wheel pieces, the entire lower portion of the truck is free and open to inspection or repairs and at the same time the entire structure is well within the scope of the limited distance from the rails to the top of the truck frame or to the under side of the car body.

We have shown and described a truck frame including the wheel pieces as being cast in a single piece, but it will be readily understood that a built up structure having hollow wheel pieces may be constructed and in Fig. 7 we have shown a hollow wheel piece composed of top and bottom members $a$ preferably in the form of channels and connected to the webs thereof are vertically disposed plates $b$, one of which may be cut away to form openings to permit inspection of the equalizing members.

We are aware that arrangements of the parts other than those shown may be made without departing from the spirit of our invention and it is intended that the scope of our invention as set forth in the appended claims shall be construed to include all obvious changes and arrangements.

We claim:

1. In a truck construction, the combination of wheel carrying axles and a truck frame having hollow wheel pieces which are located wholly above the axles, of equalizing members located with said hollow wheel pieces.

2. In a truck construction, the combination with wheel carrying axles and a truck frame, the wheel pieces of which frame are located wholly above the axles and journal boxes, of equalizing members located within said wheel pieces.

3. In a truck construction, the combination with wheel carrying axles, journal boxes therefor, and a truck frame having wheel pieces located above the axles and journal boxes, of equalizing members located within said wheel pieces and arranged to yieldingly support the truck frame upon the journal boxes.

4. In a truck construction, the combination with wheel carrying axles, journal boxes therefor and a truck frame having hollow wheel pieces which are positioned wholly above the axles and journal boxes, of equalizing members arranged within the hollow wheel pieces of the truck frame, certain of which equalizing members rest upon the journal boxes.

5. In car truck construction, a truck frame having wheel pieces, portions of which are channel shape in cross section, and portions of which are box shape in cross section, which wheel pieces lie wholly above the axles and journal boxes of the truck.

6. In car truck construction, a truck frame having substantially hollow wheel pieces which lie wholly above the axles and journal boxes of the truck, and a series of equalizing members arranged within said hollow wheel pieces for yieldingly supporting the truck frame.

7. In car truck construction, a truck frame having substantially hollow wheel pieces which lie wholly above the axles and journal boxes of the truck, and a series of equalizing members arranged within said hollow wheel pieces for yieldingly supporting the truck frame, certain of which equalizing members project through openings in the bottoms of the substantially hollow wheel pieces and bear upon the journal boxes.

8. In a car truck, the combination with wheel carrying axles and journal boxes of a truck frame having wheel pieces lying wholly above the axle and journal boxes, and a series of alternately arranged flexible and rigid equalizing members, positioned within said wheel pieces and arranged substantially in longitudinal alinement.

9. In a truck construction, a truck frame having side members which lie wholly above the axles and journal boxes of the truck, and an equalizing bar located within one of said side members.

10. In a truck construction, wheel carrying axles, journal boxes therefor, a truck frame having wheel pieces lying wholly above the axles and journal boxes, a truck bolster supported from the truck, and equalizing bars located within the wheel pieces and disposed wholly above the truck bolster.

11. In car truck construction, a truck frame having wheel pieces lying wholly above the journal boxes and axles of the truck, which wheel pieces are provided with horizontally disposed walls or flanges, and equalizing members arranged between said walls or flanges.

12. In a truck construction, the combination with wheel carrying axles and journal boxes, of equalizer springs supported by said journal boxes, an equalizing bar supported by said springs, and a truck frame supported by the equalizing bar which truck frame is provided with wheel pieces which substantially inclose the equalizer springs and bar.

13. In a truck construction, the combination with wheel carrying axles and journal boxes, of equalizer springs supported by said journal boxes, an equalizing bar supported by said springs, and a truck frame with which said equalizing bar has pivotal coöperation which truck frame is provided with wheel pieces which substantially inclose the equalizer springs and bar.

14. In a truck construction, a plurality of wheel carrying axles, journal boxes, half elliptic equalizer springs mounted on said journal boxes, equalizing bars coöperating in series with said springs, and a truck frame supported by said equalizing bars which truck frame is provided with wheel pieces which substantially inclose the equalizer springs and bar.

15. In a truck construction, wheel carrying axles, journal boxes, springs supported by the journal boxes, a truck frame having substantially hollow wheel pieces and means located within said substantially hollow wheel pieces for pivotally supporting said truck frame upon said springs.

16. In a truck construction, a plurality of wheel carrying axles, journal boxes, a truck frame having flanged side members which lie wholly above the axles and journal boxes of the truck, and springs supported on said journal boxes and extending longitudinally within said side members.

17. In a truck construction, wheel carrying axles, journal boxes, a truck frame having wheel pieces lying wholly above the axles and journal boxes, brake heads coöperating with the wheels carried by said axles, and equalizing members for yieldingly supporting the truck frame upon the journal boxes, said equalizing members being disposed wholly above the brake heads.

18. In a truck construction, wheel carrying axles, journal boxes, a truck frame having side members located wholly above said axles and journal boxes, equalizer springs supported upon the journal boxes and extending longitudinally within the side members, and equalizing bars coöperating with said springs and fulcrumed upon the side members.

19. A car truck having a hollow frame member located wholly above the axles and journal boxes of the truck, and an equalizing bar fulcrumed in said hollow frame member.

20. In a truck construction, a series of wheel carrying axles, journal boxes, a truck frame having tubular wheel pieces lying wholly above the axles and journal boxes, and means for flexibly supporting said frame upon the journal boxes, which means is located within the tubular wheel pieces and includes members supported upon the journal boxes, and members contacting with the truck frame, which members are connected in series at their extremities.

21. A car truck having a substantially hollow wheel piece which is located wholly above the truck axles and journal boxes, and an equalizing member located substantially within said hollow wheel piece.

22. A car truck having a substantially hollow wheel piece which is located wholly above the axles and journal boxes of the truck, a rigid equalizing member fulcrumed within said hollow wheel piece, and a flexible equalizing member located substantially within said hollow wheel piece.

23. A car truck having a substantially hollow wheel piece which is located wholly above the axles and journal boxes of the truck, a plurality of equalizing members fulcrumed within said hollow wheel piece, and a plurality of flexible equalizing members arranged substantially within the hollow wheel piece and coöperating with the rigid equalizing members.

24. A car truck having a wheel piece, parts of which are substantially box shaped in cross section and parts of which are substantially channel shaped in cross section which wheel piece is located wholly above the axles and journal boxes of the truck, and equalizing members located substantially within said wheel piece.

25. The combination with a car truck frame having substantially hollow wheel pieces which lie wholly above the axles and journal boxes of the truck, of coöperating rigid and flexible equalizing members located substantially within said hollow wheel pieces.

26. In a car truck, the combination with a truck frame having flanged wheel pieces which lie wholly above the axles and journal boxes of the truck, of coöperating rigid and flexible equalizing members arranged between the flanges of the wheel pieces.

27. In a truck construction, the combination with wheel carrying axles and journal boxes, of a truck frame having wheel pieces lying wholly above the axles and journal boxes, equalizing bars fulcrumed on said wheel pieces below the tops thereof, and equalizing springs supported by the journal boxes, and coöperating with the equalizing bars.

28. A car truck frame having a flanged wheel piece lying wholly above the truck axles and journal boxes, and a rigid equalizing member and a flexible equalizing member arranged between the flanges of said wheel piece.

29. In car construction, a truck frame having substantially hollow wheel pieces lying wholly above the journal boxes and axles of the truck, and coöperating rigid and flexible equalizing members arranged substantially within said hollow wheel pieces certain of which equalizing members rest upon the journal boxes and the remaining members being fulcrumed on the wheel pieces.

30. In a car truck, a truck frame having substantially hollow wheel pieces, each including a pair of vertically disposed parallel walls, parts of one of which walls are cut away to permit the insertion, or removal and inspection of parts located within the substantially hollow wheel pieces.

31. In a car truck, a truck frame having a substantially hollow wheel piece adapted to receive essential parts of the truck, and one of the walls of which hollow wheel piece is provided with an opening of sufficient size to permit removal and inspection of the parts within said wheel piece.

32. In a car truck, the combination with a truck frame cast in a single piece and comprising substantially hollow wheel pieces, end pieces, and cross transoms of coöperating rigid and flexible equalizing members arranged within the hollow wheel pieces of said truck frame.

33. In a car truck, the combination with a truck frame cast in a single piece and comprising substantially hollow wheel pieces, end pieces, cross transoms, and wheel guards of coöperating rigid and flexible equalizing members arranged within the hollow wheel pieces of said truck frame.

34. In a car truck, the combination with a truck frame cast in a single piece and comprising wheel pieces which are substantially channel shape throughout their length, end pieces, and cross transoms of coöperating rigid and flexible equalizing members arranged within the hollow wheel piece of said truck frame.

35. In a car truck, the combination with a truck frame cast in a single piece and comprising wheel pieces, parts of which are substantially channel shape in cross section and parts of which are substantially box shape in cross section, end pieces uniting the ends of said wheel pieces, and cross transoms uniting said wheel pieces, of coöperating rigid and flexible equalizing members arranged within the wheel pieces of said truck frame.

36. In a car truck, a truck frame having substantially hollow wheel pieces which are substantially box-shaped in cross section throughout their entire length, and a part of one of the walls of said substantially hollow wheel piece having an opening to permit the insertion, removal and inspection of parts of the truck, which are normally located within the hollow wheel pieces.

37. In car construction, the combination with wheel carrying axles and journal boxes, of a truck frame having flanged wheel pieces which lie wholly above the journal boxes and axles of the truck, and a series of equalizing members positioned between the journal boxes and the flanges of the wheel pieces for yieldingly supporting the truck frame.

In testimony whereof we hereunto affix our signatures in the presence of two witnesses, this 15th day of November, 1912.

CLARENCE H. HOWARD.
HARRY M. PFLAGER.

Witnesses:
HAL C. BELLVILLE,
FRED W. DIECKM NN.

---

Correction in Letters Patent No. 1,080,555.

It is hereby certified that in Letters Patent No. 1,080,555, granted December 9, 1913, upon the application of Clarence H. Howard and Harry M. Pflager, of St. Louis, Missouri, for an improvement in "Truck Construction," an error appears in the printed specification requiring correction as follows: Page 2, line 129, for the word "with" read *within;* and that the said Letters Patent should be read with this correction therein that the same may conform to the record of the case in the Patent Office.

Signed and sealed this 6th day of January, A. D., 1914.

[SEAL.]

J. T. NEWTON,

*Acting Commissioner of Patents.*

---

Disclaimer in Letters Patent No. 1,080,555.

DISCLAIMER.

1,080,555.—*Clarence H. Howard* and *Harry M. Pflager*, St. Louis, Mo. TRUCK CONSTRUCTION. Patent dated December 9, 1913. Disclaimer filed August 24, 1914, by the assignee, *Double Body Bolster Company.*

Enters this disclaimer—

"To the said claim (17) in the said specification which is in the following words to wit:

"In a truck construction, wheel carrying axles, journal boxes, a truck frame having wheel pieces lying wholly above the axles and journal boxes, brake heads coöperating with the wheels carried by said axles, and equalizing members for yieldingly supporting the truck frame upon the journal boxes, said equalizing members being disposed wholly above the brake heads."

[*Official Gazette, September 8, 1914.*]

rigid and flexible equalizing members arranged within the wheel pieces of said truck frame.

36. In a car truck, a truck frame having substantially hollow wheel pieces which are substantially box-shaped in cross section throughout their entire length, and a part of one of the walls of said substantially hollow wheel piece having an opening to permit the insertion, removal and inspection of parts of the truck, which are normally located within the hollow wheel pieces.

37. In car construction, the combination with wheel carrying axles and journal boxes, of a truck frame having flanged wheel pieces which lie wholly above the journal boxes and axles of the truck, and a series of equalizing members positioned between the journal boxes and the flanges of the wheel pieces for yieldingly supporting the truck frame.

In testimony whereof we hereunto affix our signatures in the presence of two witnesses, this 15th day of November, 1912.

CLARENCE H. HOWARD.
HARRY M. PFLAGER.

Witnesses:
HAL C. BELLVILLE,
FRED W. DIECKM NN.

---

Correction in Letters Patent No. 1,080,555.

It is hereby certified that in Letters Patent No. 1,080,555, granted December 9, 1913, upon the application of Clarence H. Howard and Harry M. Pflager, of St. Louis, Missouri, for an improvement in "Truck Construction," an error appears in the printed specification requiring correction as follows: Page 2, line 129, for the word "with" read *within;* and that the said Letters Patent should be read with this correction therein that the same may conform to the record of the case in the Patent Office.

Signed and sealed this 6th day of January, A. D., 1914.

[SEAL.]

J. T. NEWTON,

*Acting Commissioner of Patents.*

---

Disclaimer in Letters Patent No. 1,080,555.

DISCLAIMER.

1,080,555.—*Clarence H. Howard* and *Harry M. Pflager*, St. Louis, Mo. TRUCK CONSTRUCTION. Patent dated December 9, 1913. Disclaimer filed August 24, 1914, by the assignee, *Double Body Bolster Company.*

Enters this disclaimer—

"To the said claim (17) in the said specification which is in the following words to wit:

"In a truck construction, wheel carrying axles, journal boxes, a truck frame having wheel pieces lying wholly above the axles and journal boxes, brake heads coöperating with the wheels carried by said axles, and equalizing members for yieldingly supporting the truck frame upon the journal boxes, said equalizing members being disposed wholly above the brake heads."

[*Official Gazette, September 8, 1914.*]

Correction in Letters Patent No. 1,080,555.

It is hereby certified that in Letters Patent No. 1,080,555, granted December 9, 1913, upon the application of Clarence H. Howard and Harry M. Pflager, of St. Louis, Missouri, for an improvement in "Truck Construction," an error appears in the printed specification requiring correction as follows: Page 2, line 129, for the word "with" read *within;* and that the said Letters Patent should be read with this correction therein that the same may conform to the record of the case in the Patent Office.

Signed and sealed this 6th day of January, A. D., 1914.

[SEAL.]

J. T. NEWTON,
*Acting Commissioner of Patents.*

DISCLAIMER.

1,080,555.—*Clarence H. Howard* and *Harry M. Pflager*, St. Louis, Mo. TRUCK CONSTRUCTION. Patent dated December 9, 1913. Disclaimer filed August 24, 1914, by the assignee, *Double Body Bolster Company*.

Enters this disclaimer—

"To the said claim (17) in the said specification which is in the following words to wit:

"In a truck construction, wheel carrying axles, journal boxes, a truck frame having wheel pieces lying wholly above the axles and journal boxes, brake heads coöperating with the wheels carried by said axles, and equalizing members for yieldingly supporting the truck frame upon the journal boxes, said equalizing members being disposed wholly above the brake heads."

[*Official Gazette, September 8, 1914.*]